United States Patent
Ohki et al.

(10) Patent No.: US 8,952,988 B2
(45) Date of Patent: Feb. 10, 2015

(54) APPARATUS AND METHOD FOR PROVIDING INFORMATION PERTAINING TO UNREAD ARTICLES

(75) Inventors: Yoshihito Ohki, Tokyo (JP); Tatsushi Nashida, Kanagawa (JP); Shoichiro Moriya, Tokyo (JP)

(73) Assignee: Sony Corporation (JP)

( * ) Notice: Subject to any disclaimer, the term of this patent is extended or adjusted under 35 U.S.C. 154(b) by 130 days.

(21) Appl. No.: 13/613,539

(22) Filed: Sep. 13, 2012

(65) Prior Publication Data

US 2013/0083070 A1    Apr. 4, 2013

(30) Foreign Application Priority Data

Oct. 3, 2011   (JP) ................. 2011-219158

(51) Int. Cl.
*G06F 15/02*   (2006.01)
*G09G 5/00*    (2006.01)
*G06F 17/30*   (2006.01)

(52) U.S. Cl.
CPC .............. *G06F 15/0291* (2013.01); *G09G 5/00* (2013.01); *G06F 17/30867* (2013.01); *G06F 17/3089* (2013.01); *G09G 2340/145* (2013.01)
USPC ............................ 345/636; 715/828; 715/738

(58) Field of Classification Search
None
See application file for complete search history.

(56) References Cited

U.S. PATENT DOCUMENTS

| | | | | |
|---|---|---|---|---|
| 6,199,082 B1 * | 3/2001 | Ferrel et al. | .................... | 715/205 |
| 7,620,898 B1 * | 11/2009 | Douglis et al. | ................ | 715/738 |
| 2011/0202848 A1 * | 8/2011 | Ismalon | ........................ | 715/738 |

FOREIGN PATENT DOCUMENTS

JP      2008-262306 A     10/2008

* cited by examiner

*Primary Examiner* — David Zarka
*Assistant Examiner* — Diana Hickey
(74) *Attorney, Agent, or Firm* — Lerner, David, Littenberg, Krumholz & Mentlik, LLP

(57) ABSTRACT

An information processing apparatus includes first and second display control units and an operation region specifying unit. The first display control unit is configured to control display of an image of a content by displaying a plurality of article information pieces in a plurality of regions laid out in advance in the image, the article information pieces each being constituted of one of a character string and a picture image, and the article information pieces and the regions being correlated with each other. The operation region specifying unit is configured to specify on which of the regions in the image an operation is performed. The second display control unit is configured to control display of an additional image by displaying the article information pieces in a predetermined region in the image, the article information pieces excepting the article information piece correlated with the specified region.

9 Claims, 9 Drawing Sheets

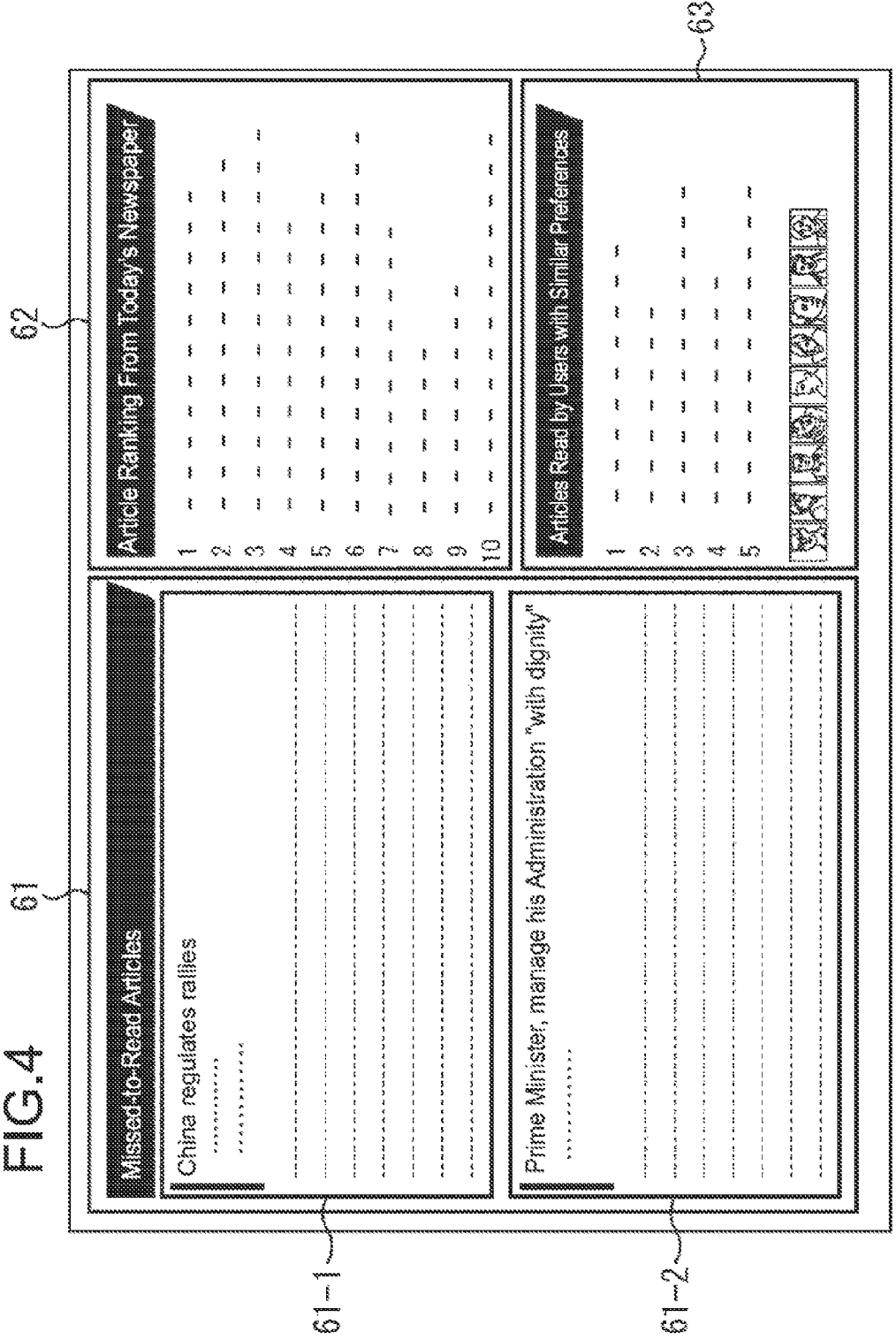

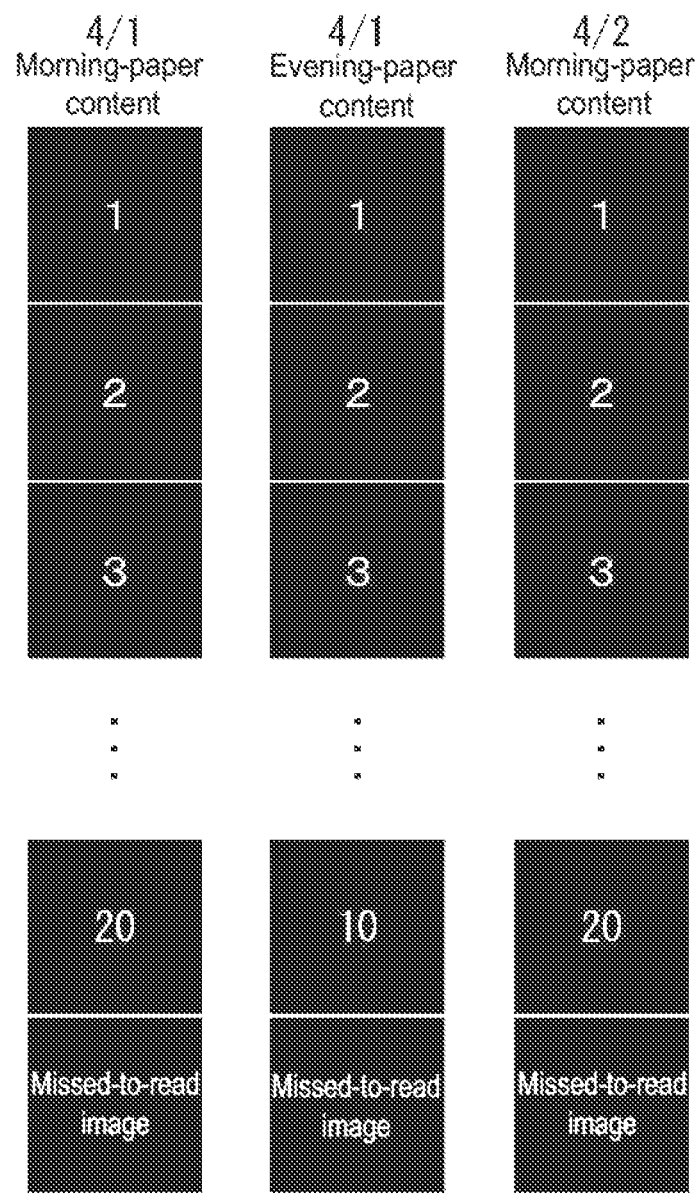

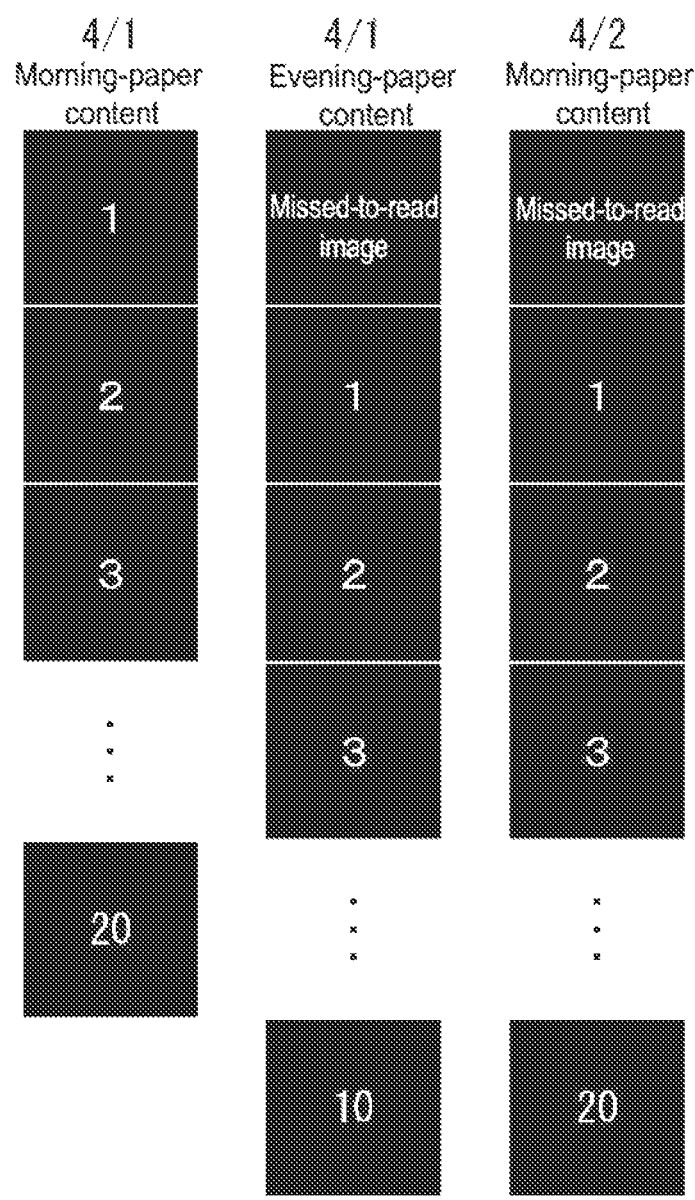

APPARATUS AND METHOD FOR PROVIDING INFORMATION PERTAINING TO UNREAD ARTICLES

CROSS-REFERENCE TO RELATED APPLICATION

The present application claims priority from Japanese Patent Application No. JP 2011-219158 filed in the Japanese Patent Office on Oct. 3, 2011, the entire content of which is incorporated herein by reference.

BACKGROUND

The present technology relates to an information processing apparatus and method, a program, and a recording medium and, more specifically, to an information processing apparatus and method, a program, and a recording medium with which users are encouraged to browse contents more often, and are provided with a high level of satisfaction with the contents.

In recent years, devices popularly developed are those displaying text-based contents of newspaper, books, and the like on their displays for browsing thereof.

The use of such devices implements a new medium of electronic newspaper or the like. More in detail, with the devices displaying contents on their displays for browsing thereof, the users are allowed to read newspaper articles as if flipping through the pages of a printed newspaper.

As an example, Japanese Patent Application Laid-open No. 2008-262306 describes a technology proposed to specify which character strings are a display target for each of a plurality of articles on the displayed image of a newspaper. As to the character strings specified as such as a display target for each of the articles, the number of characters thereof is used as a basis to adjust the size of a display region provided for display of each of the articles on the image of the newspaper.

SUMMARY

The concern here is that the users may often not take time to read all of the articles in the electronic newspaper or the like. If anything, generally, the users may first look at the articles in each page as a whole to grasp what they are about at the headline level, and then read thoroughly only the text of the articles the user found appealing.

If this is the case, however, the users may be highly likely to miss any useful articles. Therefore, encouraging the users to browse contents again is desirable by making notifications when the users miss any important articles.

On the other hand, such notifications are expected to be made at appropriate timings, or otherwise the users may feel annoyed thereby and, conversely, this may increase the possibility of decreasing the frequency of browsing.

It is thus desirable to encourage users to browse contents more often, and give them a high level of satisfaction with the contents.

According to an embodiment of the present technology, there is provided an information processing apparatus including first and second display control units and an operation region specifying unit. The first display control unit is configured to control display of the image of a content by displaying a plurality of article information pieces in a plurality of regions laid out in advance in the image, the article information pieces each being constituted of one of a character string and a picture image, and the article information pieces and the regions being correlated with each other. The operation region specifying unit is configured to specify on which of the regions in the image an operation is performed. The second display control unit is configured to control display of an additional image by displaying the article information pieces in a predetermined region in the image, the article information pieces excepting the article information piece correlated with the specified region.

The information processing apparatus may further include a display configured as a touch panel to display the image of the content. The operation region specifying unit may specify a region on the display as a region where the operation is performed, the region corresponding to a portion where a predetermined object is approached.

The article information piece may be scroll-displayed in the region where the operation is performed.

The article information piece for display in the specified region may be displayed in another image when detection is made that the operation is performed.

The content is constituted of information to be displayed on a plurality of pages. The first display control unit may change the pages of the content based on a user's command, and may control the display of the image of the content in each of the pages. The second display control unit may control the display of the additional image when an image corresponding to a last page of the content is displayed and a user's command to move to the page subsequent thereto is issued.

The content may be provided continuously on a basis of one of edition, issue, and publication. The second display control unit may control the display of the additional image when the first display control unit performs a process related to display of one of a next edition, a next issue, and a next publication of the content.

The article information pieces may be obtained from another apparatus to be connected over a network. The second display control unit may classify the article information pieces based on information coming from the other apparatus, the article information pieces excepting the article information piece correlated with the region specified by the operation region specifying unit, and may control the display of the additional image by displaying the article information pieces in the predetermined region in the image in accordance with the classification result.

The second display control unit may classify the article information pieces based on whether or not the operation is performed in another information processing apparatus, the article information pieces excepting the article information piece correlated with the region specified by the operation region specifying unit, and may control the display of the additional image by displaying the article information pieces in the predetermined region in the image in accordance with the classification result.

The regions may be laid out based on layout data, the layout data including information for defining each of the regions by position, size, and shape, and the layout data may be provided by the other apparatus to be connected over the network.

According to an embodiment of the present technology, there is provided an information processing method including controlling, by a first display control unit, display of the image of a content by displaying a plurality of article information pieces in a plurality of regions laid out in advance in the image, the article information pieces each being constituted of one of a character string and a picture image, and the article information pieces and the regions being correlated with each other, specifying, by an operation region specifying unit, on which of the regions in the image an operation is performed, and controlling, by a second display control unit, display of an additional image by displaying the article information pieces in a predetermined region in the image, the article information pieces excepting the article information piece correlated with the specified region.

According to an embodiment of the present technology, there is provided a program that causes a computer to function as an information processing apparatus including first and second display control units and an operation region specifying unit. The first display control unit is configured to control display of the image of a content by displaying a plurality of article information pieces in a plurality of regions laid out in advance in the image, the article information pieces each being constituted of one of a character string and a picture image, and the article information pieces and the regions being correlated with each other. The operation region specifying unit is configured to specify on which of the regions in the image an operation is performed. The second display control unit is configured to control display of an additional image by displaying the article information pieces in a predetermined region in the image, the article information pieces excepting the article information piece correlated with the specified region.

According to an embodiment of the present technology, display of an image of a content is controlled by displaying a plurality of article information pieces each being one of a character string and a picture image in a plurality of regions laid out in advance in the image. On which of the regions in the image an operation is performed is specified. Display of an additional image is controlled by displaying the article information pieces in a predetermined region in the image. The article information pieces herein are those excepting the article information piece correlated with the specified region.

According to the embodiments of the present technology, users are encouraged to browse contents more often, and are provided with a high level of satisfaction with the contents.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 4 is a diagram showing an exemplary screen for notifying a user which articles are missed;

FIG. 5 is a diagram illustrating a manner to additionally provide a missed-to-read image to a content;

FIG. 6 is a diagram illustrating another manner to additionally provide a missed-to-read image to a content;

DETAILED DESCRIPTION OF EMBODIMENT

Hereinafter, an embodiment of the present technology will be described with reference to the drawings.

Figure 1:
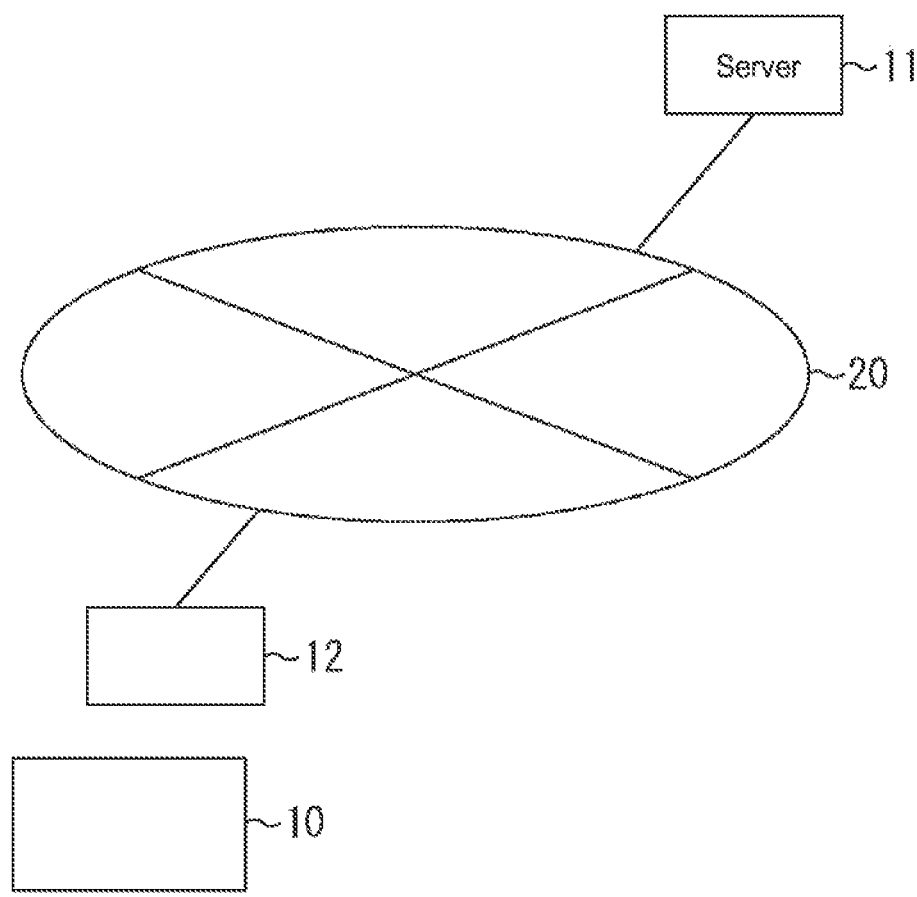
FIG. 1 is a block diagram showing an exemplary configuration of a content display system according to an embodiment of the present technology.

FIG. 1 is a block diagram showing an exemplary configuration of a content display system according to an embodiment of the present technology. The content display system of FIG. 1 includes a display apparatus 10, a server 11, an access point 12, and a network 20.

The display apparatus 10 is configured as an electronic apparatus including a display for display of contents, and is provided therein with a microcomputer or the like. The display apparatus 10 is also configured as an apparatus having communication capabilities by a predetermined communication protocol to communicate with any other apparatuses when appropriate. In such a display apparatus 10, for example, the microcomputer runs a program to process data obtained by communication with other apparatuses, thereby displaying a predetermined picture image on the display.

The display apparatus 10 accesses the network 20 via the access point 12, for example, and receives layout data, text data, and the like coming from the server 11. The display apparatus 10 runs an application program or the like installed thereto to display the contents on the display based on the data provided by the server 11, e.g., the layout data and the text data.

The server 11 is assumed to be operated and managed by a manufacturer who provides contents. The server 11 herein is for distributing newspaper contents by a newspaper publisher, for example, and transmits data such as the layout data and the text data to the display apparatus 10 over the network 20.

Exemplified herein is the case that the display apparatus 10 accesses the network 20 via the access point 12, which is connected thereto by radio communication, for example. Alternatively, the display apparatus 10 may be connected directly to the network 20.

FIG. 1 shows a piece of the display apparatus 10, but there actually exists a large number of display apparatus. With the newspaper contents, for example, the contents are made available for browsing by a plurality of users by a plurality of display apparatuses accessing the server 11 over the network 20.

Figure 2:
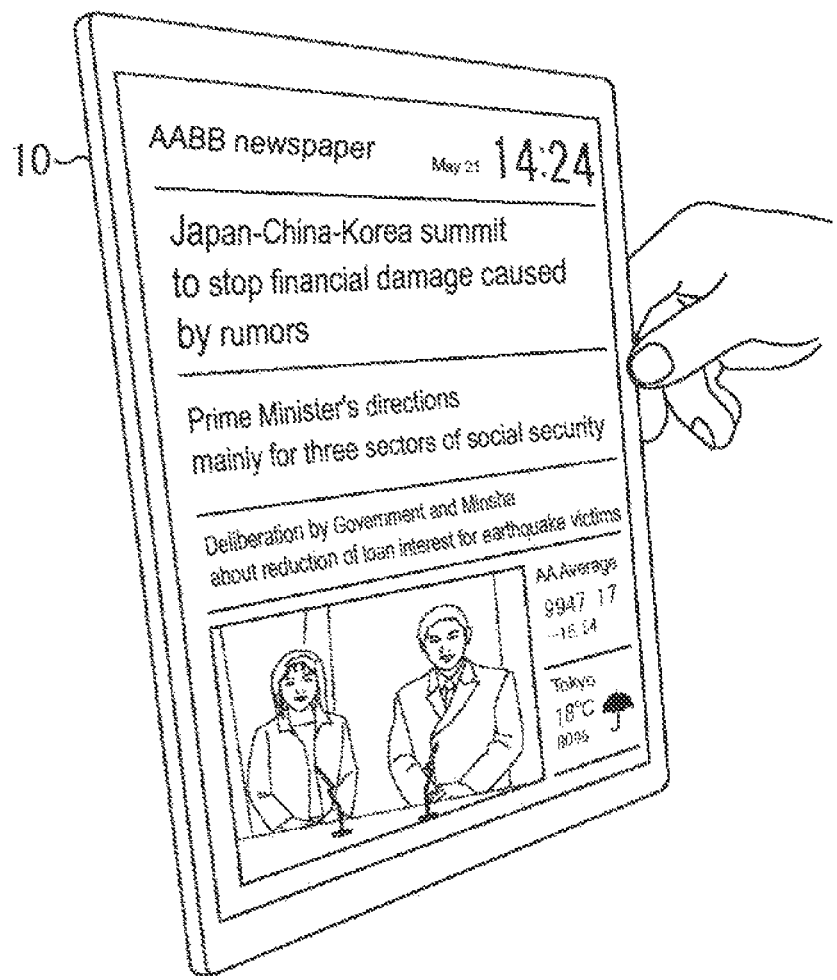
FIG. 2 is a diagram showing an exemplary outer appearance of a display apparatus to which the embodiment of the present technology is applied.

FIG. 2 is a diagram showing an exemplary outer appearance of the display apparatus 10 of FIG. 1 to which the embodiment of the present technology is applied. As shown in FIG. 2, the display apparatus 10 is configured as a device in the shape of an extremely-thin box (a hexahedron), and to at least one surface thereof, a display is provided. This display is constituted of electronic paper, for example. Alternatively, the display may be a liquid crystal display.

Herein, the display of the display apparatus 10 is provided therein with a proximity panel or the like that detects a user's finger approaching thereto by detecting any change of capacitance, for example. When the user brings his finger close to the display of the display apparatus 10, for example, a change of capacitance is detected at a predetermined position on the panel. At the position, a signal is output to indicate how close the user's finger is. As such, the display of the display apparatus 10 may be used also as a touch panel, and a picture image displayed on this display may be operated as a GUI (Graphical User Interface), for example.

The example of FIG. 2 shows the display apparatus 10 displaying a newspaper content on the display thereof. In the example of FIG. 2, the newspaper content is displayed in the portrait orientation. This is not restrictive, and with the display apparatus 10, the newspaper content may be displayed in the landscape orientation.

Figure 3B:
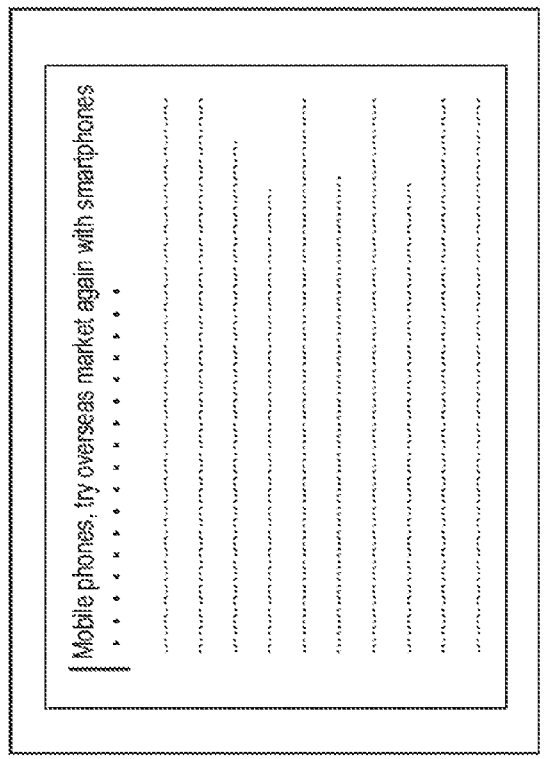
FIGS. 3A and 3B are each a diagram showing an exemplary newspaper content displayed on a display of the display apparatus of FIG. 2.
Figure 3A:
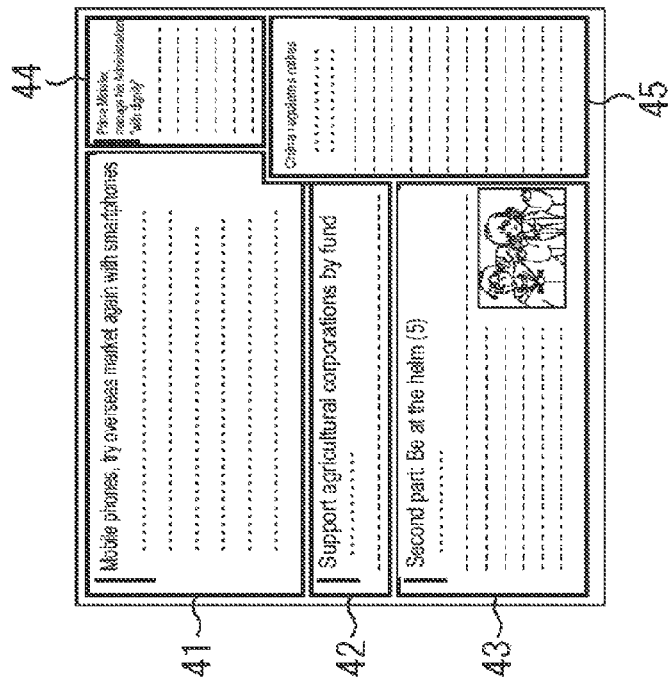

FIGS. 3A and 3B are each a diagram showing an exemplary newspaper content displayed on the display of the display apparatus 10.

FIG. 3A shows an exemplary image of a page of the newspaper content. In this example, the page of the newspaper content is divided into regions 41 to 45, and these regions 41 to 45 each display an article. These regions 41 to 45 are each defined by position, size, shape, and the like by the layout data described above. The regions are each associated with the text data so that character strings constituting the article to be displayed in each region are defined. As shown in FIG. 3A, the articles are not displayed in full text, i.e., a part of the text is not displayed, because the display has a limited space for display.

FIG. 3B shows an exemplary full-screen image of the article in the region 41 displayed on the page of FIG. 3A. In FIG. 3B, the article is displayed in full text.

With the display apparatus 10, in order to display the article in full text as shown in FIG. 3B, the user may use his finger to press down (click) a part of the region displaying the article on the upper left of the image of FIG. 3A, for example.

FIG. 3B shows the article in full text, which is partially light in color. That is, the portion light in color in FIG. 3B is the text of the article displayed on the upper left corner of the image of FIG. 3A. With a color change as such, the user who has partially read the article on the image of FIG. 3A easily perceives where the remaining part of the article starts.

In FIG. 3B, the entire article may surely be displayed in the same color, i.e., be in the same display state.

Alternatively, on the image of FIG. 3B, the text of the article displayed on the image of FIG. 3A may not be displayed. That is, the image of displaying an article in full text may not display a part of the article already displayed on the image of a page.

Still alternatively, when even the image of FIG. 3B has difficulty in displaying an article in full text because the text is large in size, the article is not necessarily displayed in full text also on the image of FIG. 3B. If this is the case, the text on the image of FIG. 3B may be scroll-displayed, for example. That is, the text of an article may be scrolled in response to the user's flick on the image of FIG. 3B, for example.

Still alternatively, any desired article may be scroll-displayed on the image of a page as in FIG. 3A, for example. That is, in response to the user's flick on the region 41 of FIG. 3A, the text of the article may be scrolled, for example. This allows the user to browse the text of any article he found appealing with understanding of the page layout.

As such, the display apparatus 10 first displays the image of a page of a newspaper content, and the user reads thoroughly any specifically appealing article found therein. This means the region displaying the article found appealing by the user is operated somehow.

The newspaper content displayed on the display of the display apparatus 10 includes articles in a plurality of pages. That is, similar to a general published newspaper, the newspaper content is created as an information medium including articles in a plurality of pages. For example, like morning and evening papers published every day by a plurality of newspaper publishers, the newspaper content is created and provided every day in the morning and evening.

When a predetermined operation set in advance is performed on the image of FIG. 3A, the display of the display apparatus 10 accordingly displays a page subsequent to the page displayed in FIG. 3A, for example. That is, the page on the display of the display apparatus 10 is changed to the next page when the user swipes across the image of FIG. 3A in one direction, or when the user depresses a GUI button or the like on the image, for example.

Herein, the page on the display of the display apparatus 10 is changed back to the previous page when the user swipes across the image of FIG. 3A in the opposite direction, or when the user depresses another GUI button or the like on the image, for example.

That is, with the newspaper content displayed on the display of the display apparatus 10, the user is allowed to read newspaper articles as if flipping through the pages of a printed newspaper.

Considered herein is a case where the user performs an operation to move to the next page after reading the last page of the newspaper content. This means the user is through with browsing of the newspaper content, but the articles may not be all thoroughly read. That is, the user may often not take time to read all of the articles in the newspaper content. If anything, generally, the user may first look at the articles in each page as a whole to grasp what they are about at the headline level, and then read thoroughly only the text of the articles the user found appealing.

At the time when the user performs the operation to move to the next page after reading the last page of the newspaper content as described above, if there is any article the user did not thoroughly read, the article is referred to as "missed-to-read article" or "article missed to read". In this example, on the image of displaying a page, e.g., on the image of FIG. 3A, any article in the region not detected as being operated is regarded as not yet thoroughly read.

With the traditional technology, for example, if a user performs an operation to move to the next page after reading the last page of a newspaper content, the first page appears again or the display of the newspaper content is terminated. In this case, however, the user is highly likely to miss any useful articles, for example. Therefore, encouraging the user to browse the content again is desirable by making notifications when the user misses any important articles.

The concern here is that such a notification is expected to be made at an appropriate timing, or otherwise the users may feel annoyed thereby.

In consideration thereof, in the embodiment of the present technology, such a notification about any missed-to-read article is made to the user as if it is a part of the newspaper content. Herein, a determination about which article in the newspaper content is missed to read is made based on whether the operation on the region displaying the article is detected or not. To be more specific, for example, any missed-to-read article is specified by first finding the region not detected as being operated from the regions designated by the layout data and then finding the article corresponding to the text data associated with the region.

In the embodiment of the present technology, when the user performs an operation to move to the next page after reading the last page of a newspaper content, the display apparatus 10 displays a screen as shown in FIG. 4. FIG. 4 is a diagram showing an exemplary image for notifying the user of his missed-to-read articles.

In the example of FIG. 4, the image displayed on the display of the display apparatus 10 is divided into three regions, i.e., regions 61, 62, and 63.

The region 61 displays "Missed-to-Read Articles" at the top thereof. The region 61 displays, for example, any of the articles recommended by the publisher for readers to thoroughly read but missed to read by the user of the display apparatus 10. In this example, the display apparatus 10 is assumed to obtain information on which articles are the publisher-recommended articles when receiving the layout data and the text data.

In the example of FIG. 4, the region 61 includes an article display space 61-1, and an article display space 61-2. These article display spaces 61-1 and 61-2 each display therein an article.

When the user clicks the article display space 61-1 or 61-2 in the region 61, the corresponding article is displayed in full text, for example. Alternatively, the user may flick the article display space 61-1 or 61-2 in the region 61 to scroll the text of the corresponding article. As such, with some operation performed on the article display space(s) in the region 61, the corresponding article(s) are regarded as thoroughly read.

The region 62 displays "Article Ranking" at the top thereof. The region 62 displays, for example, any of the articles in the newspaper content often read thoroughly by the readers but missed to read by the user of the display apparatus 10. The newspaper contents are made available for browsing by a plurality of users by a plurality of display apparatuses accessing the server 11 over the network 20. That is, the server 11 is regularly provided with information on which article is thoroughly read by which of the display apparatuses, for example. This server 11 is configured to rank the articles in a morning-paper content on a certain day. Such ranking of articles is determined based on the number of counts of thorough reading by all readers (users), and information thereabout is regularly distributed to all of the display apparatuses, for example.

In the example of FIG. 4, the region 62 displays ten article titles. The left side of the article titles displays numbers from 1 to 10, which are respectively assigned to the article titles. These numbers are assigned in decreasing order of the number of counts of thorough reading by all of the users, for example. That is, as to the articles missed to read by the user of the display apparatus 10, ten articles are specified in decreasing order of the number of counts read thoroughly by other users. Thereafter, the titles of the articles found as such are displayed in the region 62.

Exemplified above is the case that ten articles missed to read by the user of the display apparatus 10 are specified in decreasing order of the number of thorough-reading counts, and the titles of the articles found as such are displayed in the region 62. This is surely not restrictive, and the article titles may be displayed in any other manner. That is, as to articles in a morning-paper content on a certain day, ten articles are specified in decreasing order of the number of thorough-reading counts by all of the users, and the titles of these articles are displayed, for example. At this time, the titles of the articles missed to read by the user of the display apparatus may be displayed in different color from the remaining titles.

Moreover, for example, when the user clicks any of the article titles displayed in the region 62, the corresponding article is displayed in full text, for example. With such an operation to display the full-text article under the title displayed in the region 62, the article is regarded as thoroughly read.

The region 63 displays "Articles Read by Users with Similar Preferences" at the top thereof. The region 63 displays, for example, any of the articles in the newspaper content often read thoroughly by other users with similar preferences to the user of the display apparatus 10 but missed to read by the user. For example, the users provided with the newspaper contents for browsing are analyzed in advance in terms of their preferences by questionnaires, for example. The users are then classified into a predetermined number of groups, and the classification results are managed by the server 11. The server 11 may rank articles in a morning-paper content on a certain day based on the number of thorough-reading counts by the readers (users) in each of the groups, and information thereabout is regularly distributed to all of the display apparatuses, for example.

In the example of FIG. 4, the region 63 displays five article titles. The left side of the article titles displays numbers from 1 to 5, which are respectively assigned to the article titles. These numbers are assigned in decreasing order of the number of thorough-reading counts, for example. That is, as to the articles missed to read by the user of the display apparatus 10, five articles are specified in decreasing order of the number of thorough-reading counts by the users in the same group. Thereafter, the titles of the articles found as such are displayed in the region 63.

Exemplified above is the case that five articles missed to read by the user of the display apparatus 10 are specified in decreasing order of the number of thorough-reading counts by other users, and the titles of the articles found as such are displayed in the region 63. This is surely not restrictive, and the article titles may be displayed in any other manner. That is, for example, as to articles in a morning-paper content on a certain day, five articles are specified in decreasing order of the number of thorough-reading counts by the users in the same group, and the titles of these articles are displayed. At this time, the titles of the articles missed to read by the user of the display apparatus 10 may be displayed in different color from the remaining titles.

At the bottom portion of the region 63, a plurality of icons are displayed, e.g., nine icons in this example. These icons at the bottom portion of the region 63 each represent a user in the same group who is a member of a social network, and whose icon is available for use by anyone, for example.

Moreover, for example, when the user clicks any of the article titles displayed in the region 63, the corresponding article is displayed in full text. With such an operation to display the full-text article under the title displayed in the region 63, the article is regarded as thoroughly read.

Such an image for notifying the user about the articles missed to read (hereinafter, referred to as "missed-to-read image") as shown in FIG. 4 is displayed when the user performs an operation to move to the next page after reading the last page of the newspaper content, for example. The missed-to-read image is displayed as if it is the last page of the newspaper content.

That is, the missed-to-read image is additionally provided to the newspaper content as shown in FIG. 5. Assumed here is that a morning-paper content has 20 pages, and an evening-paper content has 10 pages. With a morning-paper content on April 1 (4/1), a missed-to-read image related to articles therein is additionally provided to the 21st page. With an evening-paper content on April 1 (4/1), a missed-to-read image related to articles therein is additionally provided to the 11th page. With a morning-paper content on April 2 (4/2), a missed-to-read image related to articles therein is additionally provided to the 21st page.

Herein, the newspaper content is assumed to be continuously provided on the basis of edition, issue, or publication like a morning-paper content for today, an evening-paper content also for today, a morning-paper content for tomorrow, an evening-paper content also for tomorrow, a morning-paper content for the day after tomorrow, an evening-paper content also for the day after tomorrow, and the like.

With the newspaper contents as such, the user is given an opportunity to thoroughly read easily any article missed to read. That is, in the display apparatus 10, when the user performs an operation to move to the next page after reading the last page of a newspaper content, the missed-to-read image as shown in FIG. 4 is displayed. With the image as such, a list of the missed-to-read articles is provided to the user as are the pages of the newspaper content. Moreover, the missed-to-read articles are displayed in groups based on the recommendation by the publisher for the readers to thoroughly read, based on the number of thorough-reading counts, and the like. This helps the user determine which articles are useful for him.

Herein, the missed-to-read image is not necessarily provided additionally as described by referring to FIG. 5, and may be additionally provided in any other manner, e.g., the missed-to-read image may be additionally provided as shown in FIG. 6.

Also in the example of FIG. 6, a morning-paper content has 20 pages, and an evening-paper content has 10 pages. Assumed in the example of FIG. 6 is that the user of the display apparatus 10 starts receiving a newspaper content from April 1. With a morning-paper content on April 1 (4/1), no missed-to-read image is additionally provided. With an evening-paper content on April 1 (4/1), a missed-to-read image related to articles in the morning-paper content on April 1 (4/1) is additionally provided to the 1st page. With a morning-paper content on April 2 (4/2), a missed-to-read image related to articles in the evening-paper content on April 1 (4/1) is additionally provided to the 1st page.

With the newspaper content as such, the user is given an opportunity to thoroughly read easily any article missed to read. Moreover, because the missed-to-read image is additionally provided to the next issue, the user is given an opportunity to relax and take time to thoroughly read the articles he has missed to read. Herein, the next issue of a morning-paper content is an evening-paper content on the same day, and the next issue of an evening-paper content is a morning-paper content on the next day.

Alternatively, how the missed-to-read image is additionally provided may be selected by the user, e.g., selection of the manner as shown in FIG. 5 or 6.

Exemplified above is the missed-to-read image as shown in FIG. 4, but the missed-to-read image does not necessarily include all of the regions 61 to 63. That is, the missed-to-read image may be created as the image of FIG. 3A, i.e., the regions each include an article recommended by the publisher for readers to thoroughly read but missed to read by the user of the display apparatus 10, for example.

Still alternatively, with the missed-to-read image created as the image of FIG. 3A, the articles in each region may be those in the region 62 of "Article Ranking" or those in the region 63 of "Articles Read by Users with Similar Preferences".

A notification about the missed-to-read articles is expected to be made at an appropriate timing, or otherwise the users may feel annoyed thereby and, conversely, this may increase the possibility of decreasing the frequency of browsing.

According to the embodiment of the present technology, a missed-to-read image is displayed smoothly with unbroken continuity without annoying the user. Moreover, by looking at the missed-to-read image, the user understands why these articles he has missed to read are recommended to thoroughly read. As such, the embodiment of the present technology encourages users to browse contents more often, and gives them a high level of satisfaction with the contents.

Figure 7:
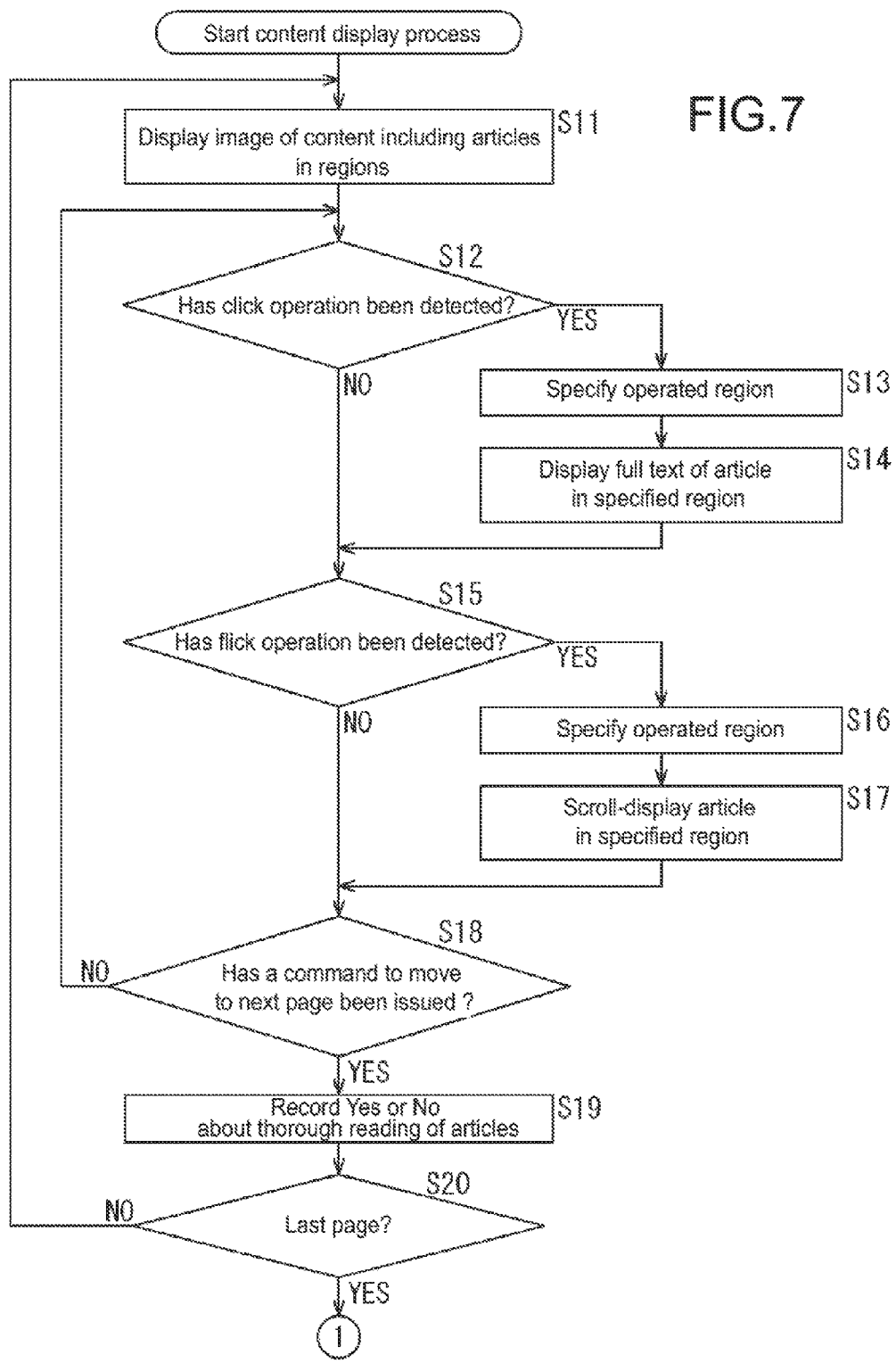
FIG. 7 is a flowchart of an exemplary content display process.

By referring to flowcharts of FIGS. 7 and 8, described next is an exemplary content display process to be performed by the display apparatus 10. Herein, a display target is a newspaper content, and a missed-to-read image is displayed when a user performs an operation to move to the next page after reading the last page of the newspaper content. The missed-to-read image is for articles in the same newspaper content, and is displayed in the same issue.

In step S11, the display apparatus 10 displays thereon an image of a content including articles in each region. At this time, displayed is the screen as shown in FIG. 3A.

In step S12, the display apparatus 10 determines whether a click operation is detected or not. When the user uses his finger to click a part of a region displaying an article on the display, for example, a determination in step S12 is made that the click operation is detected.

In step S12, when the determination is made that the click operation is detected, the procedure goes to step S13.

In step S13, the display apparatus 10 specifies which region is operated. This accordingly specifies which of a plurality of layout-data-designated regions (regions each displaying an article) is detected as being operated by a click.

In step S14, the display apparatus 10 displays the article in full text in the region specified by the process in step S13. When the user uses his finger to click a part of the region displaying the article on the upper left of the image of FIG. 3A, for example, the article is displayed in full text as shown in FIG. 3B.

In step S12, when the determination is made that the click operation is not detected, or after the process in step S14, the procedure goes to step S15.

In step S15, the display apparatus 10 determines whether or not a flick operation is detected. When the user uses his finger to flick a part of a region displaying an article on the display, a determination in step S15 is made that the flick operation is detected.

In step S15, when the determination is made that the flick operation is detected, the procedure goes to step S16.

In step S16, the display apparatus 10 specifies which region is operated. This accordingly specifies which of a plurality of layout-data-designated regions (regions each displaying an article) is detected as being operated by a flick.

In step S17, the display apparatus 10 displays the article to be scrolled in the region specified by the process in step S16.

In step S15, when the determination is made that the flick operation is not detected, or after the process in step S17, the procedure goes to step S18.

In step S18, the display apparatus 10 determines whether or not a command to move to the next page is issued. That is, when the user swipes across the image as shown in FIG. 3A, or when the user depresses a GUI button or the like on the image, for example, the determination in step S18 is made that the command to move to the next page is issued.

In step S18, when the determination is made that the command to move to the next page is issued, the procedure goes to step S19.

In step S19, the display apparatus 10 records Yes or No whether the articles in the image displayed in step S11 are each thoroughly read. That is, the display apparatus 10 records Yes to the article corresponding to the region specified in step S16, and No to the remaining articles.

In step S19, a table or the like showing the correlation between the identification numbers of the articles and Yes and No about thorough reading are recorded in a memory or the like in the microcomputer.

In step S20, the image displayed by the process in step S11 is determined whether it is the last page of the newspaper content or not. In step S20, when the determination is made that the image is not the last page of the newspaper content, the procedure goes back to step S11, and the newspaper content is continuously displayed on a page basis.

Figure 8:
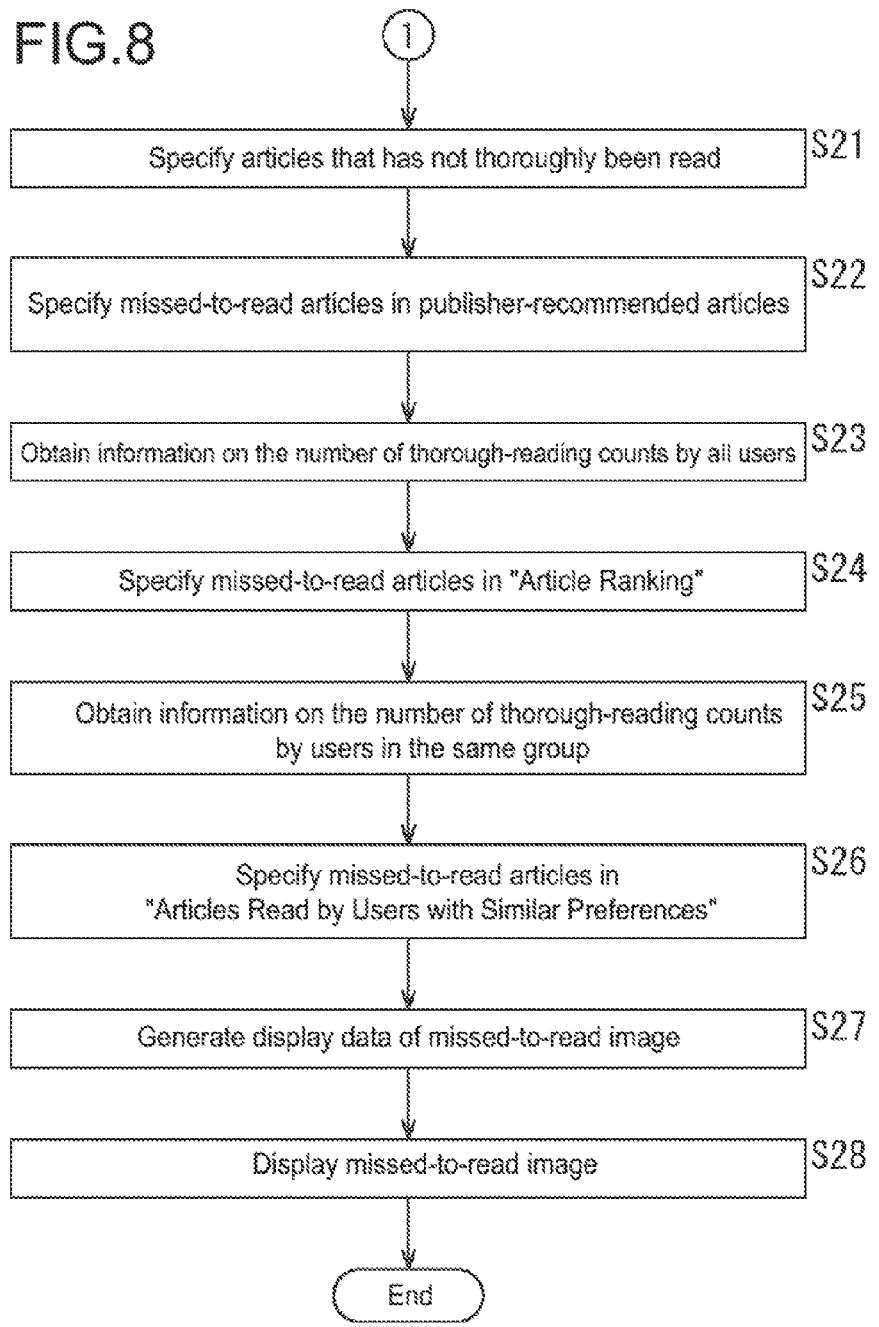
FIG. 8 is another flowchart of the exemplary content display process.

On the other hand, when the determination in step S20 is made that the page is the last page of the newspaper content, the procedure goes to step S21 in FIG. 8.

In step S21, the display apparatus 10 specifies which of the articles in the current newspaper content is not thoroughly read. At this time, the information recorded by the process in step S19 in FIG. 7 is used as a basis to specify which article is not thoroughly read.

In step S22, the display apparatus 10 specifies which of the articles recommended by the publisher for readers to thoroughly read is missed to read by the user of the display apparatus 10. That is, the display apparatus 10 specifies which articles to display in the region 61 of FIG. 4. In this example, the display apparatus 10 is assumed to obtain information on which articles are the publisher-recommended articles when receiving the layout data and the text data.

In step S23, the display apparatus 10 obtains information on how many times the articles are each thoroughly read by all of the users.

As an example, the server 11 is regularly provided with information on which article is thoroughly read by which of the display apparatuses. The server 11 then rank the articles in the newspaper content based on the number of counts thorough reading by all of the users, and information thereabout is regularly distributed to all of the display apparatuses. In step S23, the information obtained by the display apparatus 10 is the one that has been distributed thereto as such, and received and stored therein, for example.

In step S24, the display apparatus 10 specifies which of the articles in the "Article Ranking" is missed to read by the user. That is, as described above by referring to FIG. 4, as to the articles missed to read by the user of the display apparatus 10, the display apparatus 10 specifies ten articles in decreasing order of the number of counts read thoroughly by all of the users, for example. To be more specific, the display apparatus 10 specifies which articles to display in the region 62 of FIG. 4.

In step S25, the display apparatus 10 obtains information on the thorough-reading counts by the users in the same group.

The users provided with the newspaper contents for browsing are analyzed in advance in terms of their preferences by questionnaires, for example. The users are then classified into a predetermined number of groups, and the classification results are managed by the server 11, for example. The server 11 may rank articles in the newspaper content based on the number of thorough-reading counts by the readers (users) in each of the groups, and information thereabout is regularly distributed to all of the display apparatuses, for example. In step S25, the information obtained by the display apparatus 10 is the one that has been distributed thereto as such, and received and stored therein, for example.

In step S26, the display apparatus 10 specifies which of the articles in the "Articles Read by Users with Similar Preferences" is missed to read by the user. That is, as described above by referring to FIG. 4, as to the articles missed to read by the user of the display apparatus 10, the display apparatus 10 specifies five articles in decreasing order of the number of counts read thoroughly by all users in the same group. To be more specific, the display apparatus 10 specifies which articles to display in the region 63 of FIG. 4.

In step S27, the display apparatus 10 generates display data of a missed-to-read image.

In step S28, the display apparatus 10 displays the missed-to-read image. At this time, displayed on the display of the display apparatus 10 is the image described above by referring to FIG. 4, for example.

As such, the content display process is performed.

Exemplified above is the case of mainly displaying a newspaper content on the display apparatus 10. Alternatively, the display apparatus 10 may display a magazine content or a WEB page content, for example, and also in these cases, the embodiment of the present technology is applicable.

Figure 9:
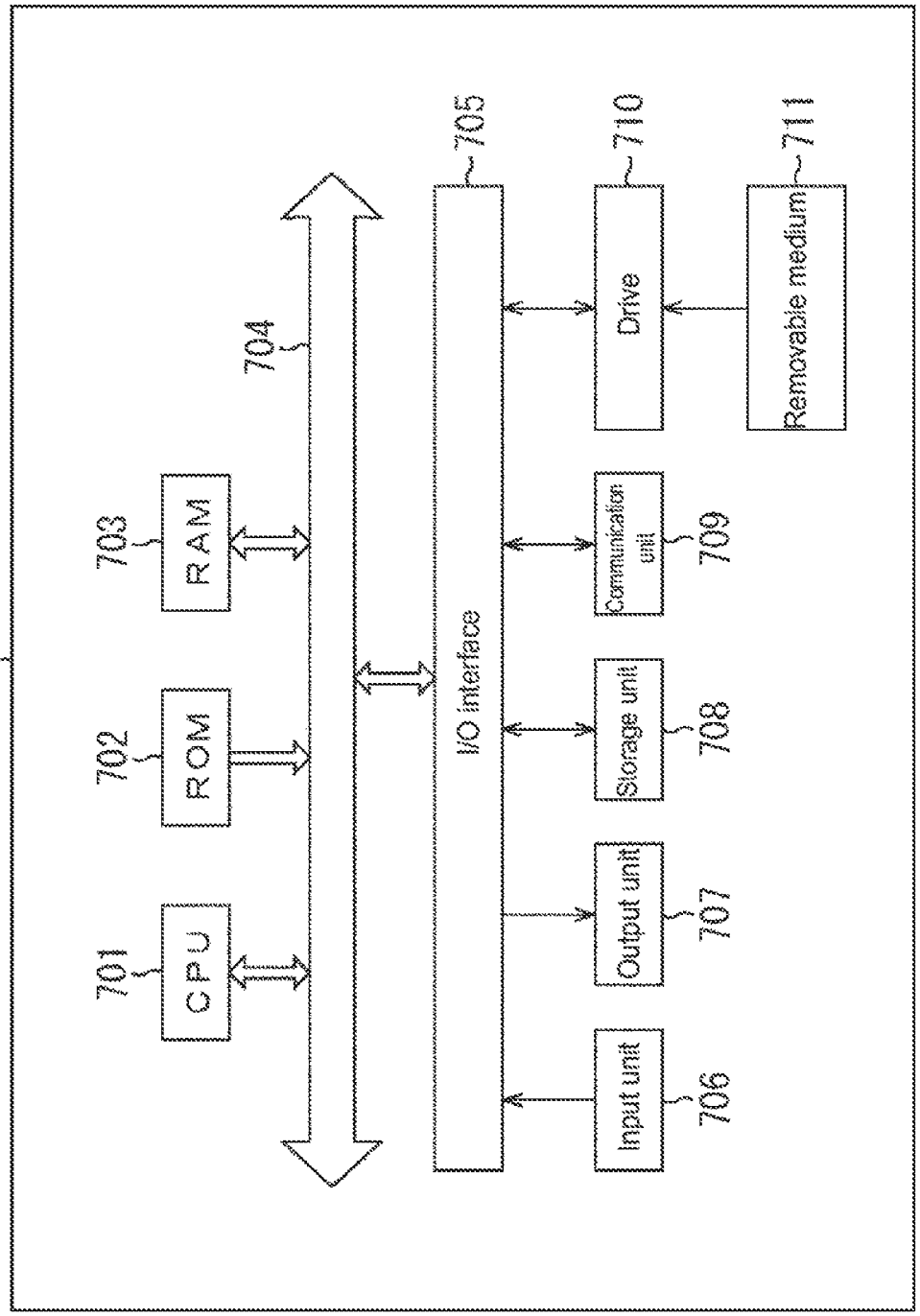
FIG. 9 is a block diagram showing an exemplary configuration of a personal computer.

The procedure described above may be performed by hardware or by software. When the procedure is performed by software, a program configuring the software is installed over a network or from a recording medium to a computer incorporated in any specifically-designed hardware, or to a general-purpose personal computer 700 as shown in FIG. 9, for example. The personal computer 700 is capable of performing various functions by various programs installed thereto.

In FIG. 9, a CPU (Central Processing Unit) 701 performs various processes by running a program stored in a ROM (Read Only Memory) 702, or a program loaded to a RAM (Random Access Memory) 703 from a storage unit 708. The RAM 703 stores also data or the like for use by the CPU 701 to perform various programs.

The components, i.e., the CPU 701, the ROM 702, and the RAM 703, are connected together via a bus 704. This bus 704 is connected also with an input/output (I/O) interface 705.

The I/O interface 705 is connected with an input unit 706, an output unit 707, a storage unit 708, and a communication unit 709. The input unit 706 is constituted of a keyboard, a mouse, and the like, and the output unit 707 is constituted of a display being an LCD (Liquid Crystal Display) or the like, a speaker, and the like. The storage unit 708 is constituted of a hard disk or the like, and the communication unit 709 is constituted of a modem, and a network interface card such as a LAN (Local-Area Network) card, for example. The communication unit 709 performs a communication process over a network including the Internet.

The I/O interface 705 is also connected with a drive 710 as appropriate, and is mounted as appropriate with a removable medium 711 exemplified by a magnetic disk, an optical disk, a magneto-optical disk, or a semiconductor memory, and a computer program read therefrom is installed as appropriate to the storage unit 708.

For performing the above-described processes by software, a program configuring the software is installed over a network such as the Internet or from a recording medium such as the removable medium 711, for example.

Note that this recording medium is not restricted to be constituted of the program-recorded removable medium 711 that is distributed to deliver a program to users separately from the apparatus body as shown in FIG. 9, e.g., a magnetic disk (including a Floppy Disk™), an optical disk (including a CD-ROM (Compact Disk-Read Only Memory), and a DVD (Digital Versatile Disk), a magneto-optical disk (including MD (Mini-Disk)™), or a semiconductor memory. The recording medium also includes the program-recorded ROM 702 that is incorporated into the apparatus body for distribution to the users, or a hard disk included in the storage unit 708, for example.

It should be noted herein that the steps for describing a series of steps above include not only the processes to be executed sequentially in the described order but also the processes to be executed not necessarily sequentially but concurrently or discretely.

Further, embodiments of the present technology are not limited to the above-mentioned embodiments and various modifications can be made without departing from the gist of the present technology.

The present technology may also take the following configurations.

(1) An information processing apparatus, including:

a first display control unit configured to control display of an image of a content by displaying a plurality of article information pieces in a plurality of regions laid out in advance in the image, the article information pieces each being constituted of one of a character string and a picture image, and the article information pieces and the regions being correlated with each other;

an operation region specifying unit configured to specify on which of the regions in the image an operation is performed; and a second display control unit configured to control display of an additional image by displaying the article information pieces in a predetermined region in the image, the article information pieces excepting the article information piece correlated with the specified region.

(2) The information processing apparatus according to (1), in which the content is constituted of information to be displayed on a plurality of pages, the first display control unit changes the pages of the content based on a user's command, and controls the display of the image of the content in each of the pages, and the second display control unit controls the display of the additional image when an image corresponding to a last page of the content is displayed and a user's command to move to the page subsequent thereto is issued.

(3) The information processing apparatus according to (1) or (2), in which the content is provided continuously on a basis of one of edition, issue, and publication, and the second display control unit
 controls the display of the additional image when the first display control unit performs a process related to display of one of a next edition, a next issue, and a next publication of the content.

(4) The information processing apparatus according to any one of (1) to (3), in which the article information pieces are obtained from another apparatus to be connected over a network, and the second display control unit
 classifies the article information pieces based on information coming from the other apparatus, the article information pieces excepting the article information piece correlated with the region specified by the operation region specifying unit, and
 controls the display of the additional image by displaying the article information pieces in the predetermined region in the image in accordance with a result of the classification.

(5) The information processing apparatus according to any one of (1) to (4), in which the second display control unit
 classifies the article information pieces based on whether or not the operation is performed in another information processing apparatus, the article information pieces excepting the article information piece correlated with the region specified by the operation region specifying unit, and
 controls the display of the additional image by displaying the article information pieces in the predetermined region in the image in accordance with a result of the classification.

(6) The information processing apparatus according to any one of (1) to (5), further including a display configured as a touch panel to display the image of the content, in which the operation region specifying unit
 specifies a region on the display as a region where the operation is performed, the region corresponding to a portion where a predetermined object is approached.

(7) The information processing apparatus according to any one of (1) to (6), in which the article information piece is scroll-displayed, the article information piece being displayed in the region where the operation is performed.

(8) The information processing apparatus according to any one of (1) to (7), in which the article information piece for display in the specified region is displayed in another image when a detection is made that the operation is performed.

(9) The information processing apparatus according to any one of (1) to (8), in which the regions are laid out based on layout data, the layout data including information for defining each of the regions by position, size, and shape, and the layout data is provided by another apparatus to be connected over a network.

(10) An information processing method, including:

controlling, by a first display control unit, display of an image of a content by displaying a plurality of article information pieces in a plurality of regions laid out in advance in the image, the article information pieces each being constituted of one of a character string and a picture image, and the article information pieces and the regions being correlated with each other;

specifying, by an operation region specifying unit, on which of the regions in the image an operation is performed; and controlling, by a second display control unit, display of an additional image by displaying the article information pieces in a predetermined region in the image, the article information pieces excepting the article information piece correlated with the specified region.

(11) A program that causes a computer to function as an information processing apparatus including a first display control unit configured to control display of an image of a content by displaying a plurality of article information pieces in a plurality of regions laid out in advance in the image, the article information pieces each being constituted of one of a character string and a picture image, and the article information pieces and the regions being correlated with each other, an operation region specifying unit configured to specify on which of the regions in the image an operation is performed, and a second display control unit configured to control display of an additional image by displaying the article information pieces in a predetermined region in the image, the article information pieces excepting the article information piece correlated with the specified region.

(12) A recording medium on which the program according to (11) is recorded.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, said apparatus comprising a processing component and a storage device having a program stored therein which when executed causes the processing component to perform as:

a first display control unit configured to control display of an image of a content by displaying a plurality of article information pieces in a plurality of regions laid out in advance in the image, the article information pieces each being constituted of one of a character string and a picture image, and the article information pieces and the regions being correlated with each other;

an operation region specifying unit configured to specify on which of the regions in the image an operation is performed; and a second display control unit configured to control display of an additional image by displaying the article information pieces in a predetermined region in the image, the article information pieces excepting the article information piece correlated with the specified region, in which each article information piece represents a news article, and performance of the operation provides an indication that a user read a respective news article, and in which the additional image includes (i) a news article or articles which were unread by the user and (ii) ranking information which indicates a ranking of at least some of the unread news articles.

2. The information processing apparatus according to claim 1, wherein the content is constituted of information to be displayed on a plurality of pages, the first display control unit changes the pages of the content based on a user's command, and controls the display of the image of the content in each of the pages, and the second display control unit controls the display of the additional image when an image corresponding to a last page of the content is displayed and a user's command to move to the page subsequent thereto is issued.

3. The information processing apparatus according to claim 1, wherein the content is provided continuously on a basis of one of edition, issue, and publication, and the second display control unit controls the display of the additional image when the first display control unit performs a process related to display of one of a next edition, a next issue, and a next publication of the content.

4. The information processing apparatus according to claim 1, wherein the article information pieces are obtained from another apparatus to be connected over a network.

5. The information processing apparatus according to claim 1, further comprising a display configured as a touch panel to display the image of the content, wherein the operation region specifying unit specifies a region on the display as a region where the operation is performed, the region corresponding to a portion where a predetermined object is approached.

6. The information processing apparatus according to claim 1, wherein the article information piece for display in the specified region is displayed in another image when a detection is made that the operation is performed.

7. The information processing apparatus according to claim 1, wherein the regions are laid out based on layout data, the layout data including information for defining each of the regions by position, size, and shape, and the layout data is provided by another apparatus to be connected over a network.

8. An information processing method, comprising:

controlling, by a first display control unit, display of an image of a content by displaying a plurality of article information pieces in a plurality of regions laid out in advance in the image, the article information pieces each being constituted of one of a character string and a picture image, and the article information pieces and the regions being correlated with each other;

specifying, by an operation region specifying unit, on which of the regions in the image an operation is performed; and controlling, by a second display control unit, display of an additional image by displaying the article information pieces in a predetermined region in the image, the article information pieces excepting the article information piece correlated with the specified region, in which each article information piece represents a news article, and performance of the operation provides an indication that a user read a respective news article, and in which the additional image includes (i) a news article or articles which were unread by the user and (ii) ranking information which indicates a ranking of at least some of the unread news articles.

9. A non-statutory computer readable storage medium having stored thereon a program that causes a computer to function as an information processing apparatus including a first display control unit configured to control display of an image of a content by displaying a plurality of article information pieces in a plurality of regions laid out in advance in the image, the article information pieces each being constituted of one of a character string and a picture image, and the article information pieces and the regions being correlated with each other, an operation region specifying unit configured to specify on which of the regions in the image an operation is performed, and a second display control unit configured to control display of an additional image by displaying the article information pieces in a predetermined region in the image, the article information pieces excepting the article information piece correlated with the specified region, in which each article information piece represents a news article, and performance of the operation provides an indication that a user read a respective news article, and in which the additional image includes (i) a news article or articles which were unread by the user and (ii) ranking information which indicates a ranking of at least some of the unread news articles.

* * * * *